United States Patent [19]
Young

[11] 4,047,630
[45] Sept. 13, 1977

[54] TILTABLE AND EXTENSIBLE TRAILER

[76] Inventor: Wilbur E. Young, Rte. 7, New Waterford, Ohio 44445

[21] Appl. No.: 654,573

[22] Filed: Feb. 2, 1976

[51] Int. Cl.² .............................................. B60P 1/28
[52] U.S. Cl. ................................ 214/506; 298/19 V; 298/22 R; 280/763; 280/656
[58] Field of Search ............ 214/505, 506, 1 H, 46.34; 298/19 V, 17 SG, 22 R; 280/762, 763, 764, 765, 766, 656; 296/26

[56] References Cited

U.S. PATENT DOCUMENTS

| | | | |
|---|---|---|---|
| 2,238,237 | 4/1941 | Thompson | 214/46.34 |
| 2,703,658 | 3/1955 | Bazzell | 214/505 |
| 2,774,606 | 12/1956 | Burweger et al. | 280/766 X |
| 3,245,714 | 4/1966 | Blair | 296/26 |
| 3,370,726 | 2/1968 | Ijichi | 214/506 |
| 3,879,050 | 4/1975 | Young | 280/766 |
| 3,887,083 | 6/1975 | Baxter | 214/515 X |

*Primary Examiner*—Albert J. Makay
*Attorney, Agent, or Firm*—Webster B. Harpman

[57] ABSTRACT

An over the road trailer has a main frame and an extensible sub-frame for increasing the length thereof by forming a ramp on one end of the trailer when the other end is elevated by an integral lifting mechanism whereby a building such as a single car garage or a portion of a multi-car garage can be moved up the ramp and trailer, secured thereto and transported to a new location and unloaded.

4 Claims, 9 Drawing Figures

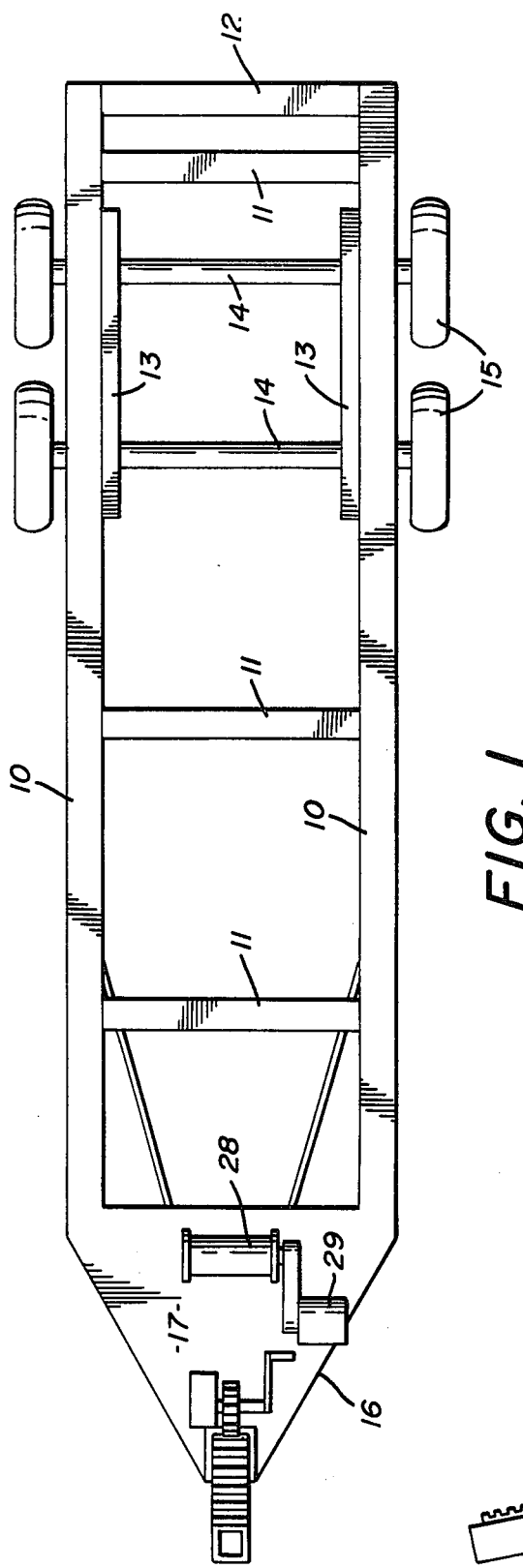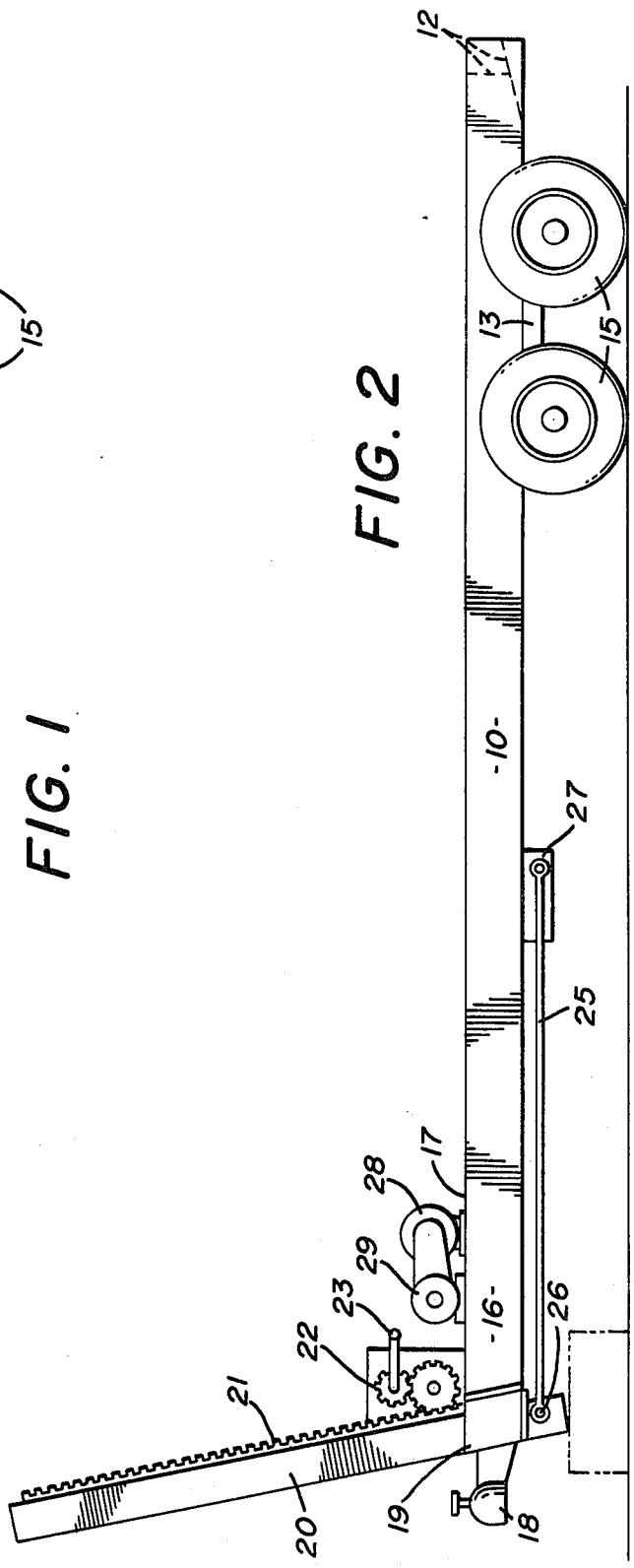

TILTABLE AND EXTENSIBLE TRAILER

BACKGROUND OF THE INVENTION

1. Field of the Invention

This invention relates to trailers arranged to temporarily support and transport articles such as a building or a portion thereof over a highway.

2. Description of the Prior Art

Prior structures of this type may be seen in my U.S. Pat. No. 3,879,050 issued Apr. 22, 1975.

The present invention relates to an improvement in that it discloses a trailer with an extensible sub-frame movable outwardly from one end thereof and means on the other end of the frame for elevating said other end so that the trailer and the extension form an elongated ramp such that a building or the like may be moved thereon and the trailer returned to a horizontal position for over the road travel.

SUMMARY OF THE INVENTION

A trailer for transporting buildings or the like consists of a horizontally disposed elongated frame having ground engaging wheels therebeneath and a tow bar arrangement at one end together with a vertically movable lifting arm and means for imparting vertical movement thereto whereby the one end of the trailer may be elevated to position the entire trailer at an angle from horizontal. The trailer includes an extensible sub-frame on the other end thereof which in extended position forms a ramp facilitating moving a building or other object onto the trailer or removing it therefrom, and is adjustably mounted on a wheeled bogie.

DESCRIPTION OF THE DRAWINGS

FIG. 1 is a top plan view of the tiltable and extensible trailer,

FIG. 2 is a side elevation showing the trailer in horizontal position,

DESCRIPTION OF THE PREFERRED EMBODIMENT

Figure 3:
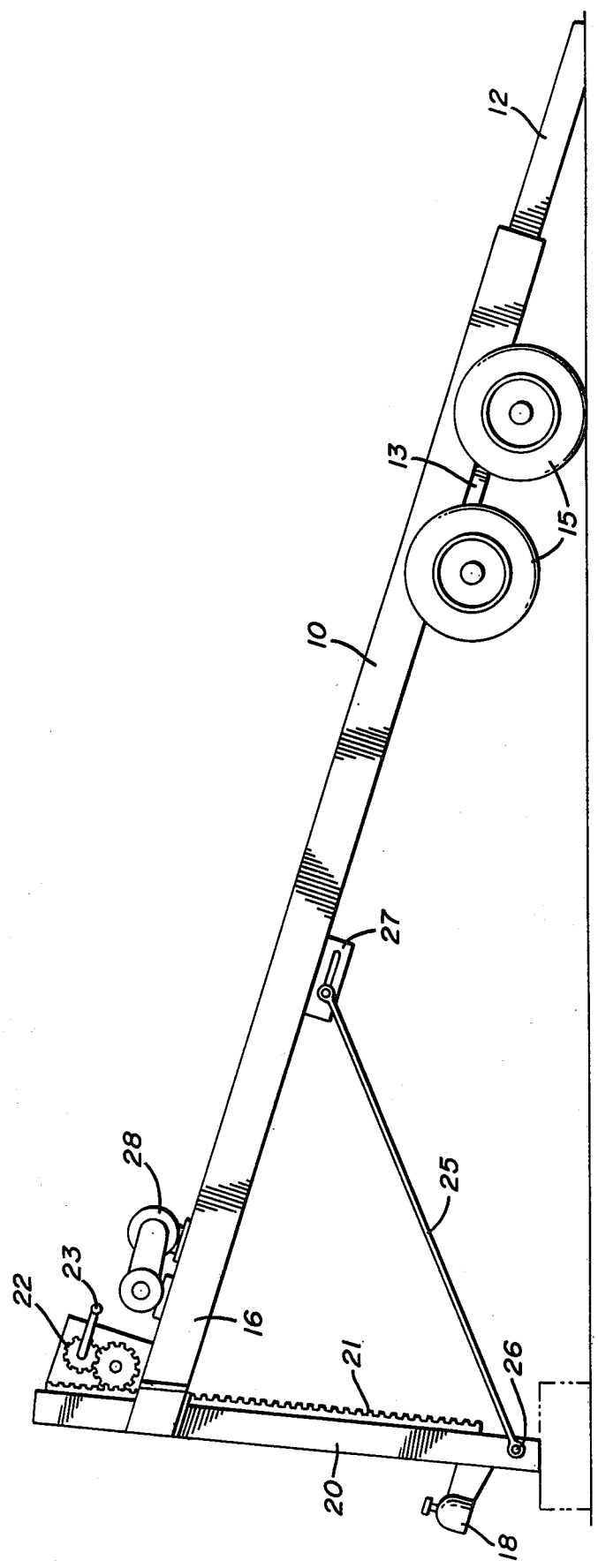
FIG. 3 is a side elevation showing the trailer in tilted and extended position.

By referring now to FIGS. 1 and 2 of the drawings a simple form of the tiltable and extensible trailer for transporting buildings or the like may be seen to comprise a pair of horizontally spaced longitudinally extending main frame members 10 which are secured in spaced parallel relation by a plurality of transversely positioned tubular frame members 11. A sub-frame 12 is positioned between the main frame members 10 and is movable longitudinally therebetween in telescopic relation and may be seen in extended position in FIG. 3 of the drawings.

Still referring to FIGS. 1 and 2 of the drawings, it will be seen that an axle carrying bogie 13 is positioned beneath the main frame members 10 and 11 and includes a pair of axles 14 with ground engaging wheels 15 thereon. The forward or left end of the trailer as seen in FIGS. 1 and 2 of the drawings has a V-shaped extension 16 thereon, the top portion of which is preferably transversely flat as indicated by the numeral 17. A tow bar and socket 18 extend outwardly from a lifting arm 20 which is movably positioned in a tubular guide 19 on the forward portion of the V-shaped extension 16 of the trailer. A device for lifting the trailer relative to the lifting arm 20 is secured to the V-shaped extension 16 of the trailer frame and as illustrated in FIGS. 1, 2 and 3 takes the form of a rack 21 on the lifting arm 20 and a reduction gear assembly 22 and crank 23 on the trailer engaging the rack 21 for moving the trailer relative to the lifting arm 20.

Alternately a hydraulic piston and cylinder assembly may be substituted for the gear reduction assembly 22 and crank 23 as hereinafter described.

The rack and pinion or the hydraulic piston and cylinder assembly permit the trailer to be moved upwardly and downwardly with the tubular guide 19 sliding along the lifting arm 20 with sufficient energy to lift the one end of the trailer in a pivoting motion on a pair of the wheels 15 or alternately on the rearmost end thereof as defined by the extension frame 12.

By referring now to FIG. 3 of the drawings, the trailer will be seen positioned in a tilted position as occurs when the lifting arm 20 is moved downwardly relative to the V-shaped extension 16 of the trailer frame members 10 and it will be observed that tie rods 25 which are pivoted at their forward ends by pivots 26 to the lower end of the lifting arm 20 are arranged so that their opposite ends are pivoted to and slidably engaged in slotted brackets 27 on the main frame members 10. The tie rods 25 insure the fixed angular position of the tilted trailer as seen in FIG. 3 of the drawings relative to the lifting arm 20 when heavy objects are moved upwardly on the trailer, for example a building to be transported thereon, as secured by support means as in my U.S. Pat. No. 3,879,050.

By referring again to FIGS. 1 and 2 of the drawings, it will be seen that a winch including a drum 28 and means 29 for rotating the same are also mounted on the V-shaped extension 16 of the trailer so that a cable not shown, movable by the drum 28 can be used to winch a heavy building or other object up the inclined trailer as seen in FIG. 3 of the drawings.

It will thus be seen that when a building or other object has been moved up the tilted and extended trailer as seen in FIG. 3 of the drawings by a cable actuated by the winch drum 28, the lifting arm 20 is actuated so as to move the same upwardly relative to the V-shaped extension 16 of the trailer to thereby lower the trailer to the horizontal position illustrated in FIG. 2 of the drawings. The tow bar and socket 18 may then be attached to a towing vehicle and the tiltable and extensible trailer with its load moved over the road to a desired location whereupon the trailer may be again tilted by moving the lifting arm 20 downwardly, the extension frame forming the ramp 12 may be extended and the building or other object on the trailer moved therefrom.

Figure 4:
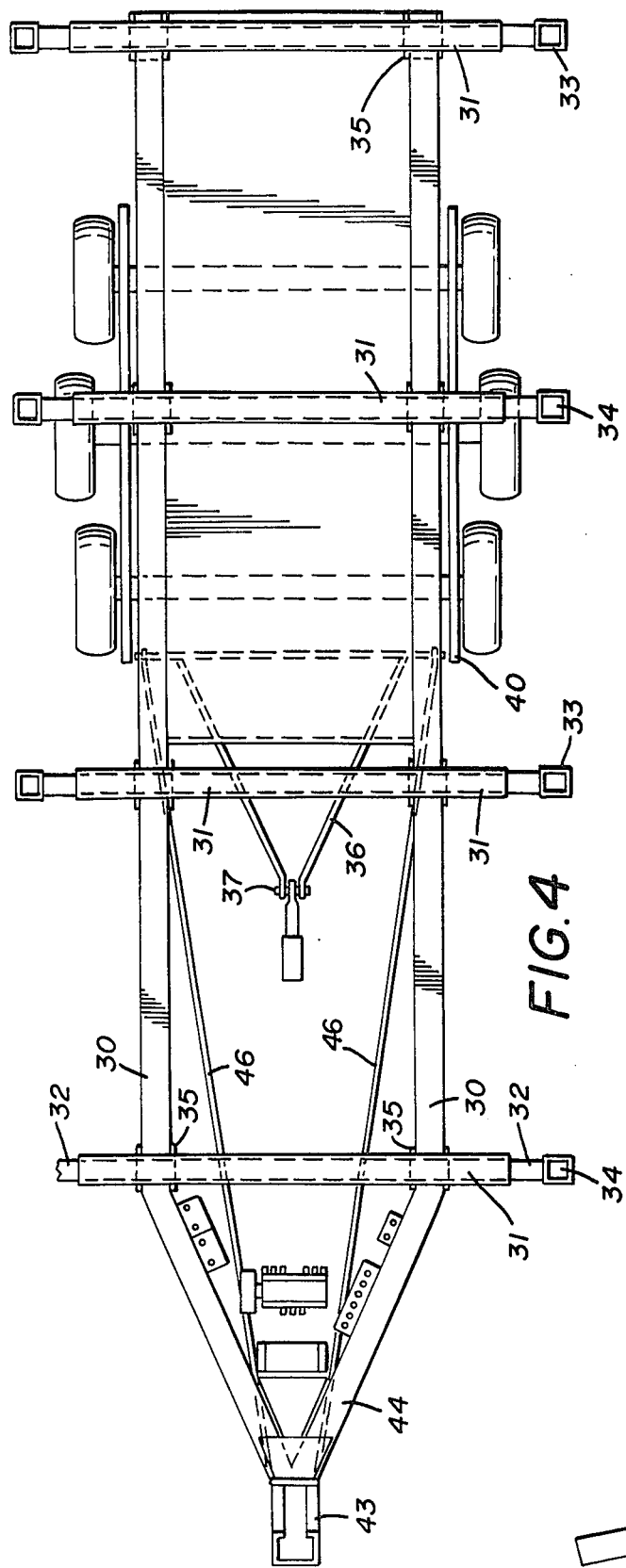
FIG. 4 is a top plan view of a modified form of the invention.
Figure 5:
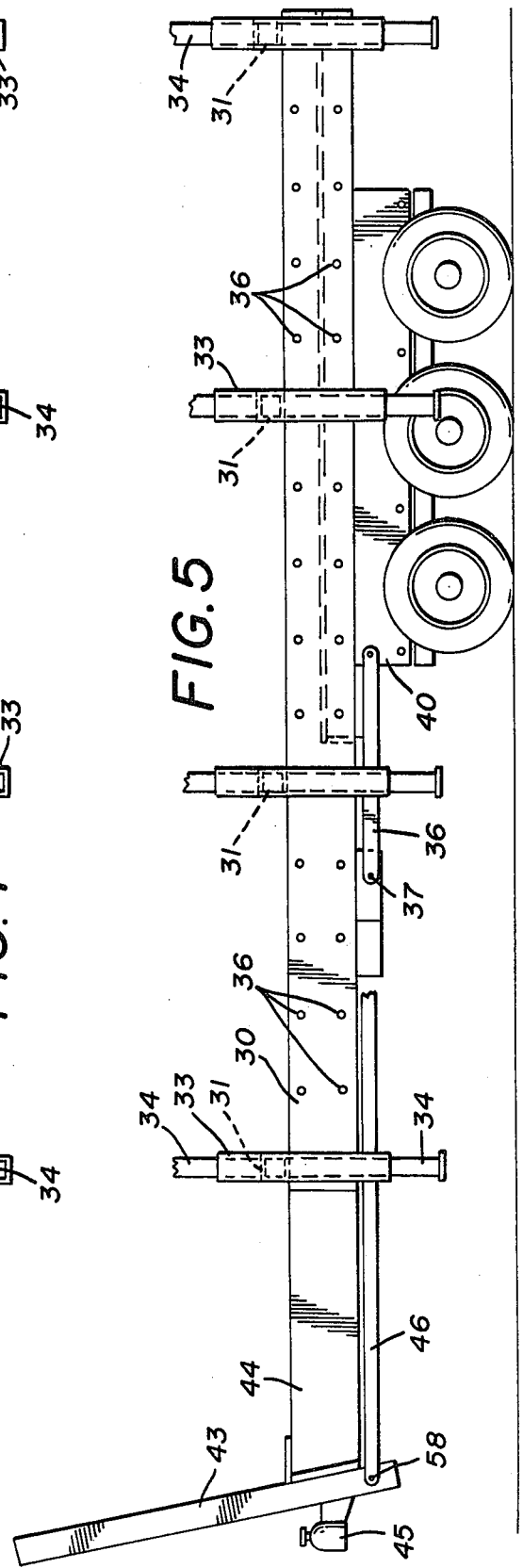
FIG. 5 is a side elevation thereof.

By referring now to FIGS. 4 and 5 of the drawings a modified form of the trailer may be seen and specifically a trailer wherein spaced longitudinally frame members 30 have a plurality of transverse tubular members 31 detachably secured thereto in longitudinally spaced relation, each of which has a pair of outwardly extending arms 32 telescopically engaged therein with each of the arms 32 carrying a vertically positioned tubular member 33 in which a vertically movable support arm 34 is positioned. The support arms 34 are movable vertically and may be positioned in desired location to support a building or the like to be carried on the trailer and as set forth in greater detail in my U.S. Pat. No. 3,879,050.

The tiltable and extensible trailer disclosed herein as seen for example in FIGS. 1, 2 and 3 of the drawings may be used without the transverse tubular mmebers 31 and the vertical support arms 34 or the same may be attached thereto and the trailer used in the same manner as the trailer disclosed in my aforesaid patent. The transverse tubular members 31 are detachably secured to the frame members 30 of the trailer seen in FIGS. 4 and 5 of the drawings by inverted U-shaped brackets 35 which are attached thereto and apertured so that bolts may be positioned through the apertures and engaged in registering pairs of a plurality of pairs of openings 36 in the frame members 30. The arrangement is best illustrated in FIG. 6 of the drawings where the bolts are indicated by the numeral 37.

Figure 6:
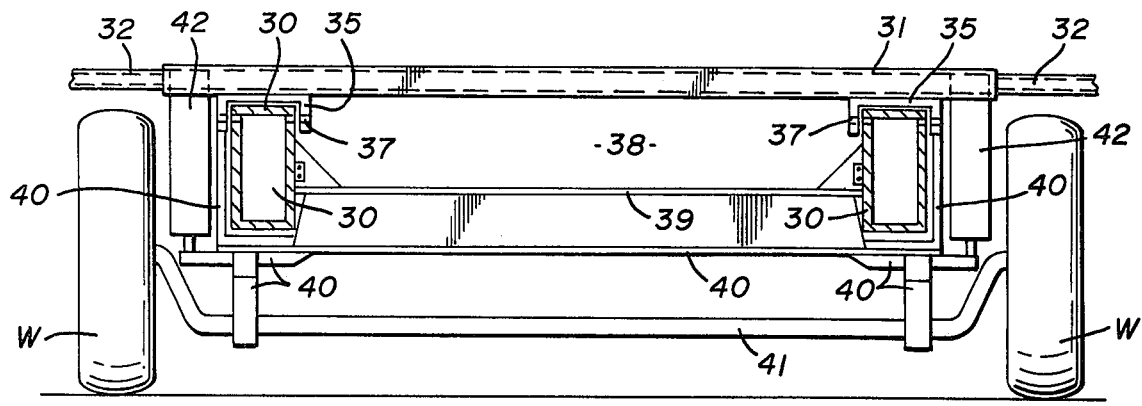
FIG. 6 is an end elevation thereof.
Figure 7:
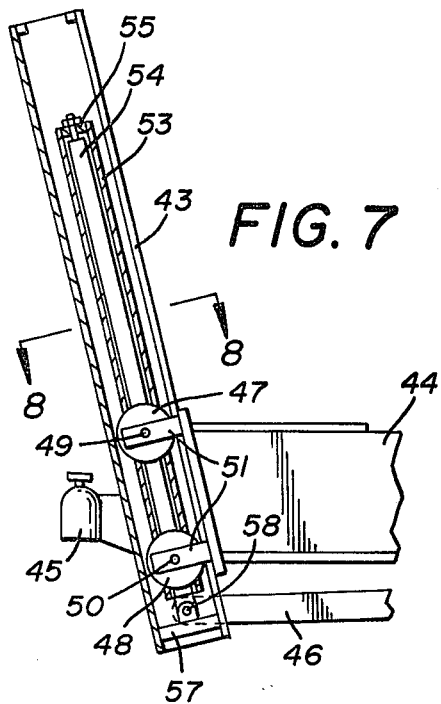
FIG. 7 is an enlarged detail of a portion of the trailer of FIG. 5.

In FIG. 6 of the drawings it will be seen that the frame members 30 are box frames and that there are transversely positioned sub-frame members 38 therebetween, the sub-frame members 38 being oppositely flanged as at 39 and in addition to lending rigidity to the trailer form an area between the box frames 30 which will receive and retain a wheeled bogie 40 which includes a plurality of drop center axles 41 and ground engaging wheels W. The sides of the wheel carrying bogie 40 are closely spaced with respect to the outer sides of the frames 30 and hydraulic piston and cylinder assemblies 42 are positioned between portions of the bogie 40 and the transverse tubular frame members 31 so that the frame can be leveled by the actuation thereof as for example when the ground engaging wheels are on an uneven surface relative to a desired horizontal plane of the trailer.

Figure 8:
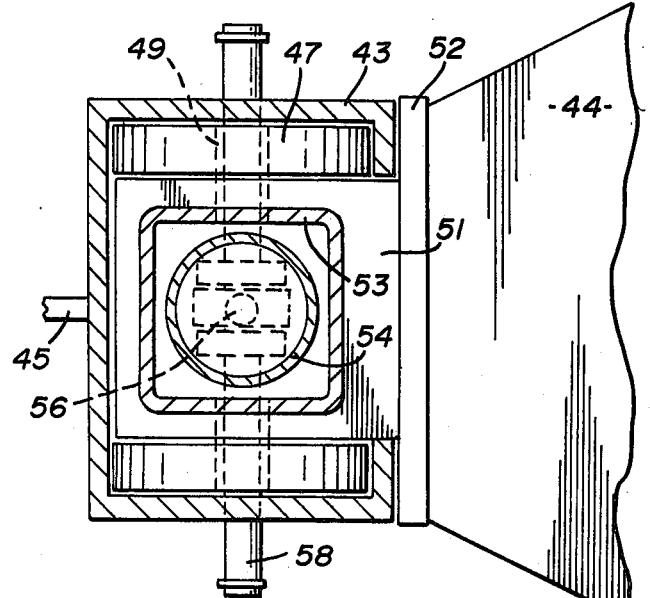
FIG. 8 is a cross section on line 8—8 of FIG. 7, enlarged.
Figure 9:
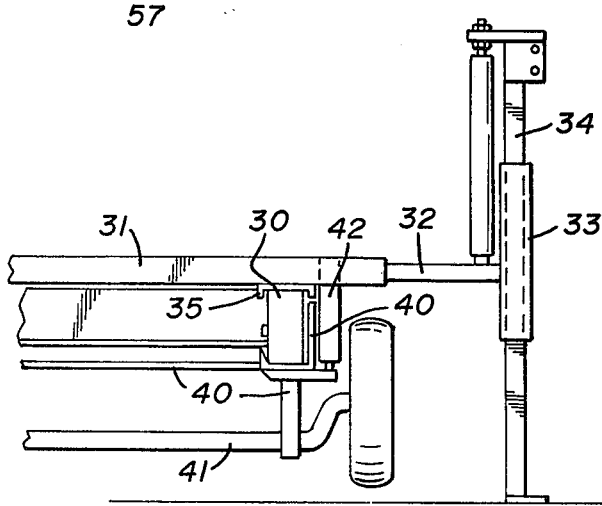
FIG. 9 is a detail showing a building supporting arm of the trailer.

The modified trailer includes a modified device for lifting the forward end of the trailer and by referring to FIGS. 4 and 5 it will be seen that a cross sectionally rectangular lifting arm 43 is angularly disposed with respect to the forward end 44 of the trailer, it is provided with a tow bar and socket 45 near its lower end and a pair of tie rods 46 are pivoted adjacent its lower end and extend backwardly for pivotal engagement with the trailer at their rearmost ends. The lifting arm 43 is slotted longitudinally so that it will receive and be movably positioned relative to upper and lower pairs of rollers 47 and 48 respectively which are positioned on stub axles 49 and 50 carried by hollow brackets 51 which are arranged in spaced relation to one another on a plate 52 which is secured to the forward end 44 of the trailer frame as best seen in FIG. 8 of the drawings. The hollow brackets 51 position a square tube 53 axially of the lifting arm 43 and in turn locates a hydraulic piston and cylinder assembly 54 therein. The upper end of the hydraulic piston and cylinder assembly 54 is secured to an upper end 55 of the tube 53 and the opposite or piston end 56 of the piston an cylinder assembly extends downwardly out of the lower end of the square tube 53 and is engaged on an end plate 57 positioned in and secured to the lower end of the lifting arm 43. A transverse pivot 58 to which the tie rods 46 are attached is also engaged on the end plate 57.

It will thus be seen that when hydraulic fluid under pressure is introduced into the hydraulic piston and cylinder assembly 54 from a source such as a pump and motor on the trailer in communication with a reservoir thereon, movement of the piston inwardly of the cylinder will move the lifting arm 43 to elevated position relative to the end of the trailer 44 and a reverse action will move the lifting arm 43 downwardly with respect thereto and thus elevate the forward end of the trailer when desired in the same manner as hereinbefore described in connection with the form of the invention seen in FIGS. 1, 2 and 3 of the drawings.

It will thus be seen that a tiltable and extensible trailer for transporting buildings or the like has been disclosed which may be positioned to permit ready loading and unloading of the building or other article with respect thereto.

Although but two embodiments of the present invention have been illustrated and described, it will be apparent to those skilled in the art that various changes and modifications may be made therein without departing from the spirit of the invention.

Having thus described my invention what I claim is.

1. A tiltable trailer consisting of a main frame, wheel and axle assemblies thereunder inwardly of the ends thereof for supporting the same, a tow bar and socket at one end of said frame by which the trailer may be towed, roller guide means on said frame adjacent said tow bar and socket, a perpendicular lifting arm movably engaging said roller guide means and means for moving the lifting arm substantially vertically with respect to the trailer so as to lift said end of the trailer and bring the other end thereof downwardly, said roller guide will inch said trailer forwardly.

2. The tiltable trailer set forth in claim 1 and wherein said means for moving the lifting arm comprises a rack on said arm and a reduction gear set on said trailer and having a gear engaging said rack and means for imparting rotary motion to said gear set.

3. The tiltable trailer set forth in claim 1 and wherein transverse tubular members are arranged on said main frame and telescopic extensions are carried thereby and right angular support arms are on said telescopic extensions.

4. The tiltable trailer set forth in claim 1 wherein the means for moving the lifting arm comprises a piston and cylinder assembly connected between said arm and said roller guide means on said trailer together with means for supplying fluid power for actuating the piston and cylinder assembly.

* * * * *